(12) United States Patent
Jackson (10) Patent No.: US 11,889,822 B2
(45) Date of Patent: Feb. 6, 2024

(54) LIVE BAIT HOLDER

(71) Applicant: Kyle Jackson, Plaistow, NH (US)

(72) Inventor: Kyle Jackson, Plaistow, NH (US)

( * ) Notice: Subject to any disclaimer, the term of this patent is extended or adjusted under 35 U.S.C. 154(b) by 0 days.

(21) Appl. No.: 17/744,058

(22) Filed: May 13, 2022

(65) Prior Publication Data

US 2023/0363366 A1 Nov. 16, 2023

(51) Int. Cl.
*A01K 83/06* (2006.01)

(52) U.S. Cl.
CPC .................................. *A01K 83/061* (2022.02)

(58) Field of Classification Search
CPC .... A01K 83/061; A01K 83/06; A01K 83/064; A01K 85/18; A01K 83/063; A01K 85/00; A01K 83/04; A01K 85/02; A01K 85/16
USPC ..... 43/44.89, 44.2, 44.29, 44.4, 44.6, 42.37, 43/42.38, 44.8, 42.36, 42.42, 42.49, 42.53
See application file for complete search history.

(56) References Cited

U.S. PATENT DOCUMENTS

| | | | | |
|---|---|---|---|---|
| 1,278,146 A | * | 9/1918 | Henthorn | A01K 83/06 43/41 |
| 1,902,217 A | * | 3/1933 | Catarau | A01K 83/06 43/44.2 |
| 2,547,592 A | * | 4/1951 | Morris | A01K 97/18 43/53.5 |
| 2,780,022 A | * | 2/1957 | Arntzen | A01K 85/16 43/44.6 |
| 2,881,550 A | | 4/1959 | Newkirk | |
| 3,105,319 A | * | 10/1963 | Whalen | A01K 83/06 43/44.4 |
| 3,156,066 A | * | 11/1964 | Munyer | A01K 83/06 43/44.4 |
| 3,197,912 A | | 8/1965 | Kramer | |
| 3,197,913 A | * | 8/1965 | Rainey | A01K 83/06 43/44.8 |
| 3,200,532 A | * | 8/1965 | Walton | A01K 83/06 43/44.8 |
| 3,271,890 A | * | 9/1966 | Davis | A01K 97/00 43/44.4 |
| D210,482 S | * | 3/1968 | Tomaiuolo | 24/562 |
| 3,415,004 A | | 12/1968 | Whalen | |
| 3,543,434 A | * | 12/1970 | Hauck | A01K 83/06 43/44.6 |
| 3,738,049 A | | 6/1973 | Garza | |
| 3,760,529 A | * | 9/1973 | Hicks | A01K 83/06 43/44.4 |

(Continued)

FOREIGN PATENT DOCUMENTS

| | | | | |
|---|---|---|---|---|
| GB | 622793 | | 5/1949 | |
| GB | 2299739 | A * | 10/1996 | A01K 83/06 |

*Primary Examiner* — Timothy D Collins
*Assistant Examiner* — Maria E Graber (57) ABSTRACT

A live bait holder includes a flexible strip elongated from a first end to a second end. The flexible strip has a pair of edges extending from a first end to a second end and extending from a first surface to a second surface. The flexible strip is elastically bendable and elastically stretchable to be disposed in a wrapped position around a bait animal to define a loop. The flexible strip is perforable for perforation by a fishhook. An O-ring elastically stretches to receive the first end and the second end simultaneously when the flexible strip is in the wrapped position. The O-ring exerts an elastic force such that the flexible strip is retained in the wrapped position.

10 Claims, 7 Drawing Sheets

(56) References Cited

U.S. PATENT DOCUMENTS

| | | | | |
|---|---|---|---|---|
| 3,893,255 | A | * | 7/1975 | Hicks .................... A01K 83/06 43/44.4 |
| 4,471,558 | A | * | 9/1984 | Garcia .................. A01K 83/06 43/44.4 |
| D360,675 | S | * | 7/1995 | Tameo .......................... D22/134 |
| 5,617,688 | A | | 4/1997 | Gandy |
| 5,870,849 | A | * | 2/1999 | Colson, Jr. ............. A01K 97/06 24/442 |
| 6,050,023 | A | * | 4/2000 | Newell .................. A01K 83/06 43/44.4 |
| D425,172 | S | * | 5/2000 | Hall ............................. D22/134 |
| 7,481,018 | B1 | | 1/2009 | Adams |
| D687,121 | S | | 7/2013 | Hardwick |
| 2009/0100737 | A1 | * | 4/2009 | Hunter .................. A01K 85/00 43/44.4 |
| 2013/0180158 | A1 | * | 7/2013 | Butters ................. A01K 85/02 43/42.1 |
| 2016/0157472 | A1 | * | 6/2016 | Neal ..................... A01K 85/18 43/41 |
| 2019/0307109 | A1 | * | 10/2019 | Dano .................... A01K 83/06 |

* cited by examiner

LIVE BAIT HOLDER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relate to bait holders. The disclosure more particularly pertains to a new live bait holder for securing live bait to a fishhook.

BRIEF SUMMARY OF THE INVENTION

An embodiment of the disclosure meets the needs presented above by generally comprising a flexible strip elongated from a first end to a second end. The flexible strip has a first surface and a second surface, each surface extending from the first end to the second end. The flexible strip has a pair of edges extending from the first end to the second end and extending from the first surface to the second surface. The flexible strip is elastically bendable and elastically stretchable and is configured to be disposed in a wrapped position around a bait animal wherein a coextensive portion of the first surface and associated coextensive portions of each edge are disposed in abutment with a surface of the bait animal to define a loop. The coextensive portion of the first surface and the associated coextensive portions of each edge exerting an elastic force compressing the bait animal and frictionally engaging the surface of the bait animal. The flexible strip is perforable and is configured for perforation by a fishhook.

An O-ring elastically stretches to receive the first end and the second end simultaneously when the flexible strip is in the wrapped position. The O-ring exerts an elastic force on the second surface proximate the first end and the second surface proximate the second end such that the flexible strip is retained in the wrapped position. The O-ring is positionable on the flexible strip while in the wrapped position adjacent to the loop such that the O-ring is configured to be held in place adjacent to the loop by insertion of the fishhook through the flexible strip adjacent to the O-ring opposite the loop.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new live bait holder embodying the principles and concepts of an embodiment of the disclosure and generally designated by the reference numeral 10 will be described.

As best illustrated in FIGS. 1 through 6, the live bait holder 10 generally comprises a flexible strip 12 that is elongated from a first end 14 to a second end 16. The flexible strip 12 has a concave surface 18 and a convex surface 20, each surface extending from the first end 14 to the second end 16. The flexible strip 12 has a pair of edges 22 extending from the first end 14 to the second end 16 and extending from the concave surface 18 to the convex surface 20. The flexible strip 12 is constructed of plastic but may be constructed of any conventional elastic material. The concave surface 18 and the pair of edges 22 are textured. The flexible strip 12 is elastically bendable and elastically stretchable. The flexible strip 12 is configured to be disposed in a wrapped position around a bait animal 28 wherein a coextensive portion of the concave surface 18 and associated coextensive portions of each edge 22 are disposed in abutment with a surface of the bait animal 28 to define a loop 24.

The coextensive portion of the concave surface 18 and the associated coextensive portions of each edge 22 exert an elastic force compressing the bait animal 28 and frictionally engage the surface of the bait animal 28. The flexible strip 12 is perforable and is configured to be perforable by a fishhook 30.

Figure 7:
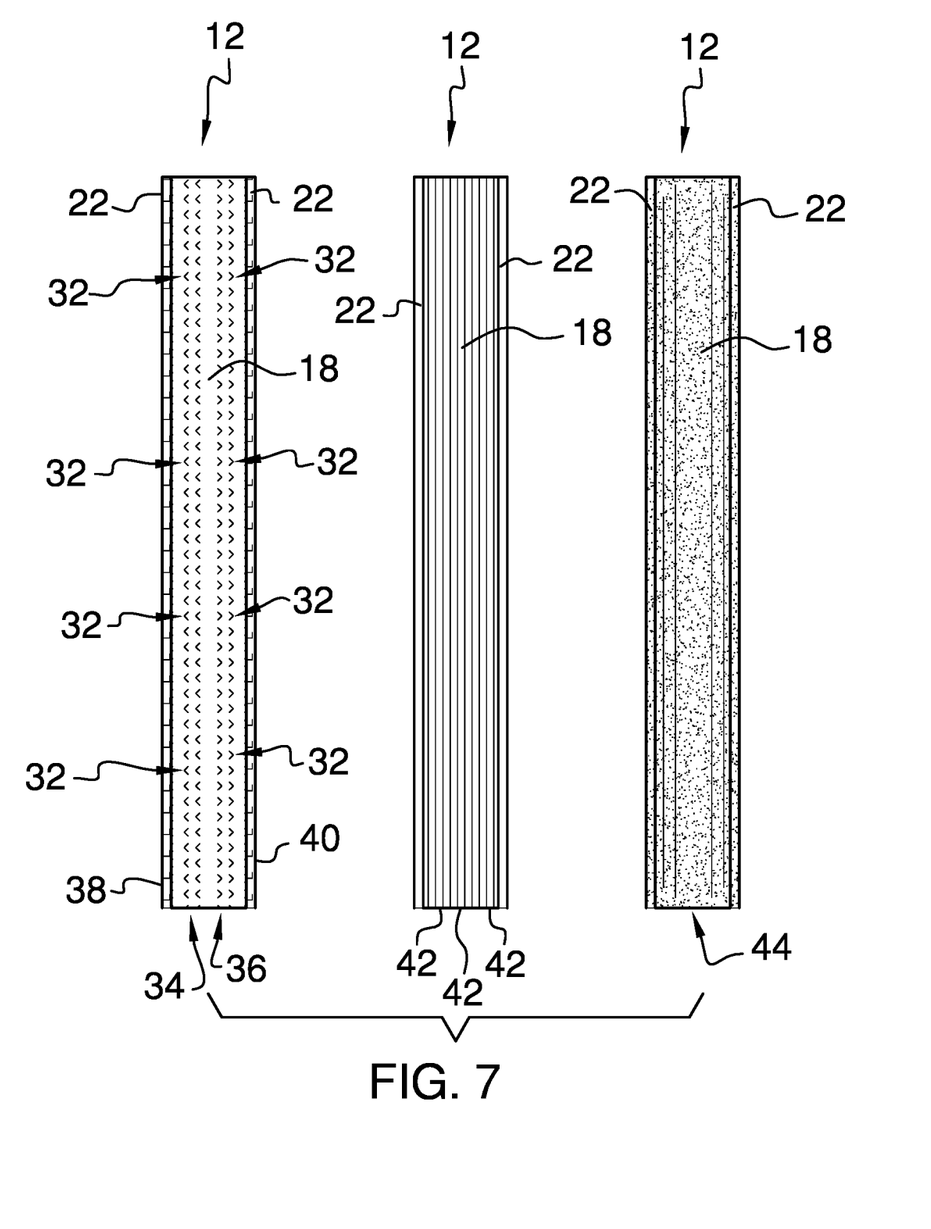
FIG. 7 is a top view of alternative embodiments of the disclosure.

The concave surface 18 and the pair of edges 22 may be textured with a plurality of sharp projections 32 extending from the concave surface 18 and each edge 22 respectively. A first group 34 of the plurality of sharp projections 32 on the concave surface 18 angle toward a first edge 38 of the edges 22 and a second group 36 of the plurality of sharp projections 32 on the concave surface 18 angle toward a second edge 40 of the edges 22. The sharp projections 32 on the edges 22 are angled toward the concave surface 18. The plurality of sharp projections 32 is configured to penetrate the surface of the bait animal while the flexible strip 12 is in the wrapped position.

The concave surface 18 and the pair of edges 22 may be textured with a plurality of ribs 42 protruding from the concave surface 18 and each edge 22 respectively wherein the ribs 42 are elongated from the first end to the second end. The concave surface 18 and the pair of edges 22 may be textured with a plurality of abrasive particulates 44 protruding from the concave surface 18 and each edge 22 respectively. The plurality of abrasive particulates 44 are constructed of glass but may be constructed of another conventional material. The concave surface 18 and the pair of edges 22 may be textured with any conventional type of texture.

Figure 1:
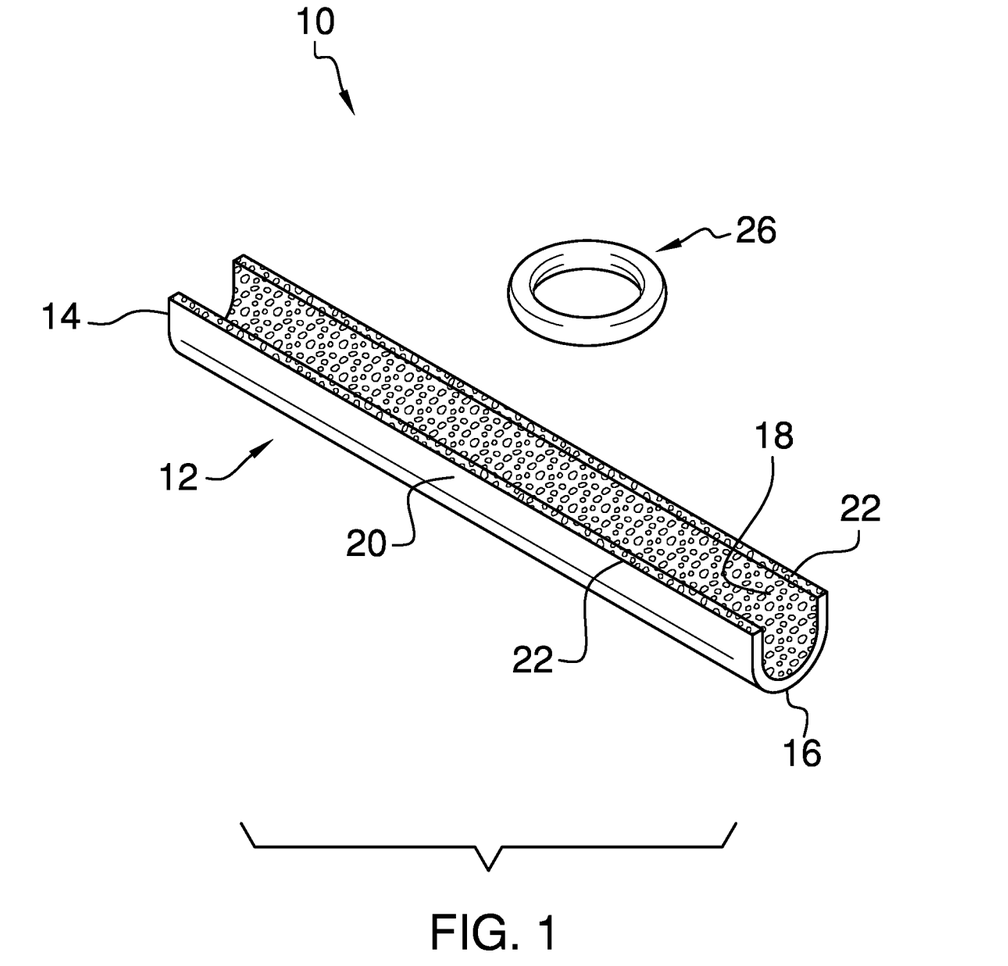
FIG. 1 is a top front side perspective view of a live bait holder according to an embodiment of the disclosure.
Figure 2:
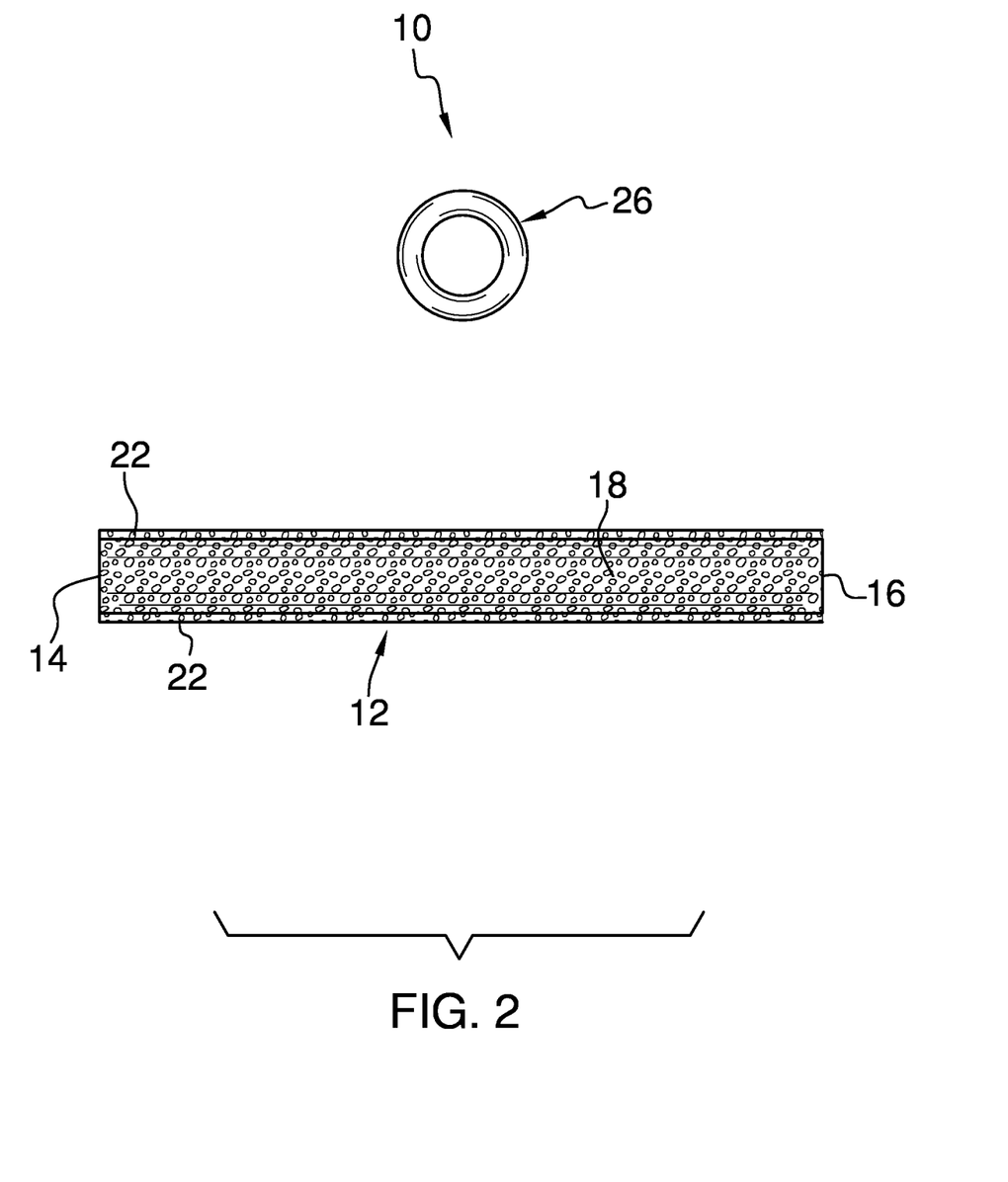
FIG. 2 is a top view of an embodiment of the disclosure.
Figure 3:
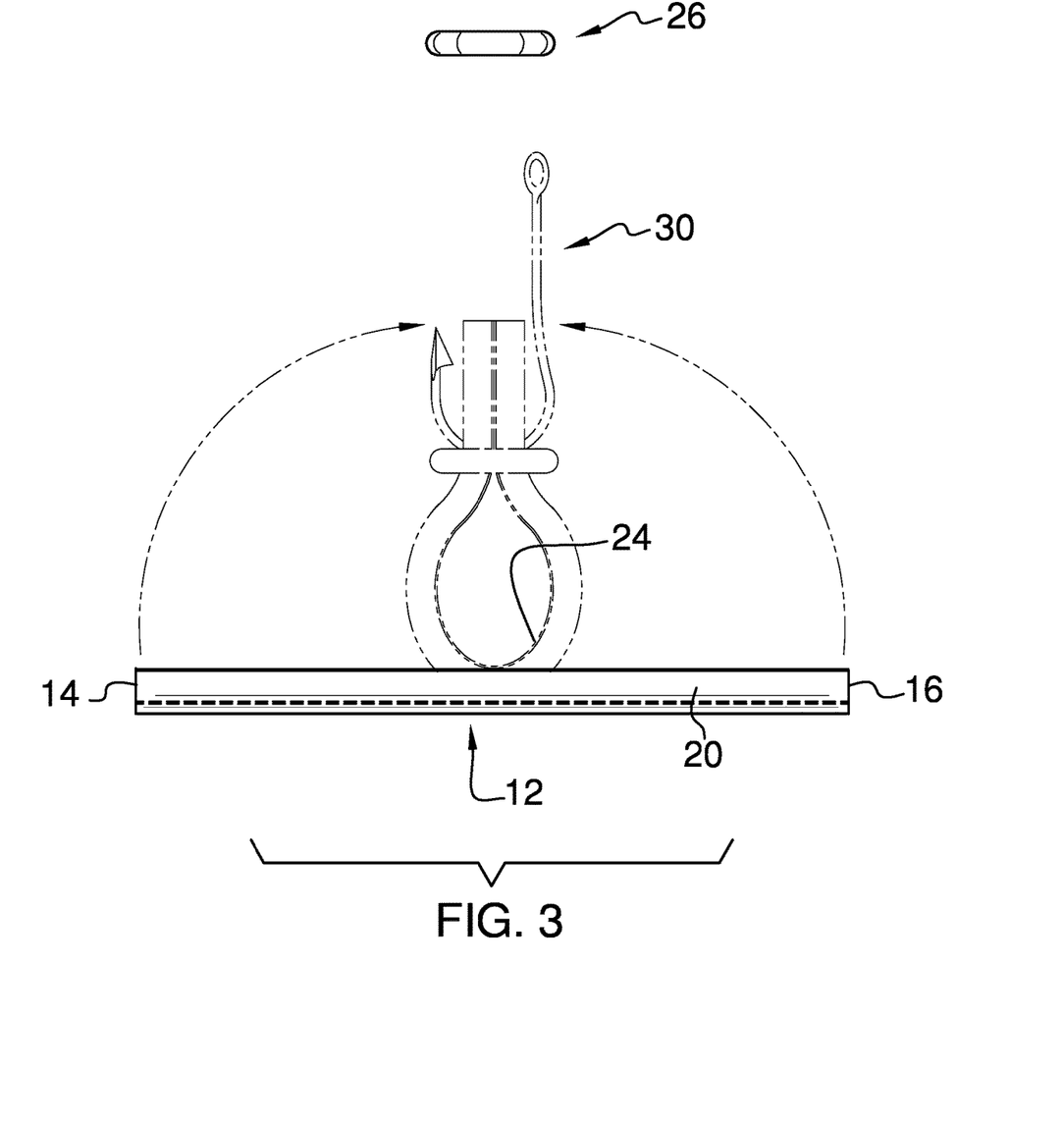
FIG. 3 is a front view of an embodiment of the disclosure showing how a flexible strip bends into a wrapped position.
Figure 4:
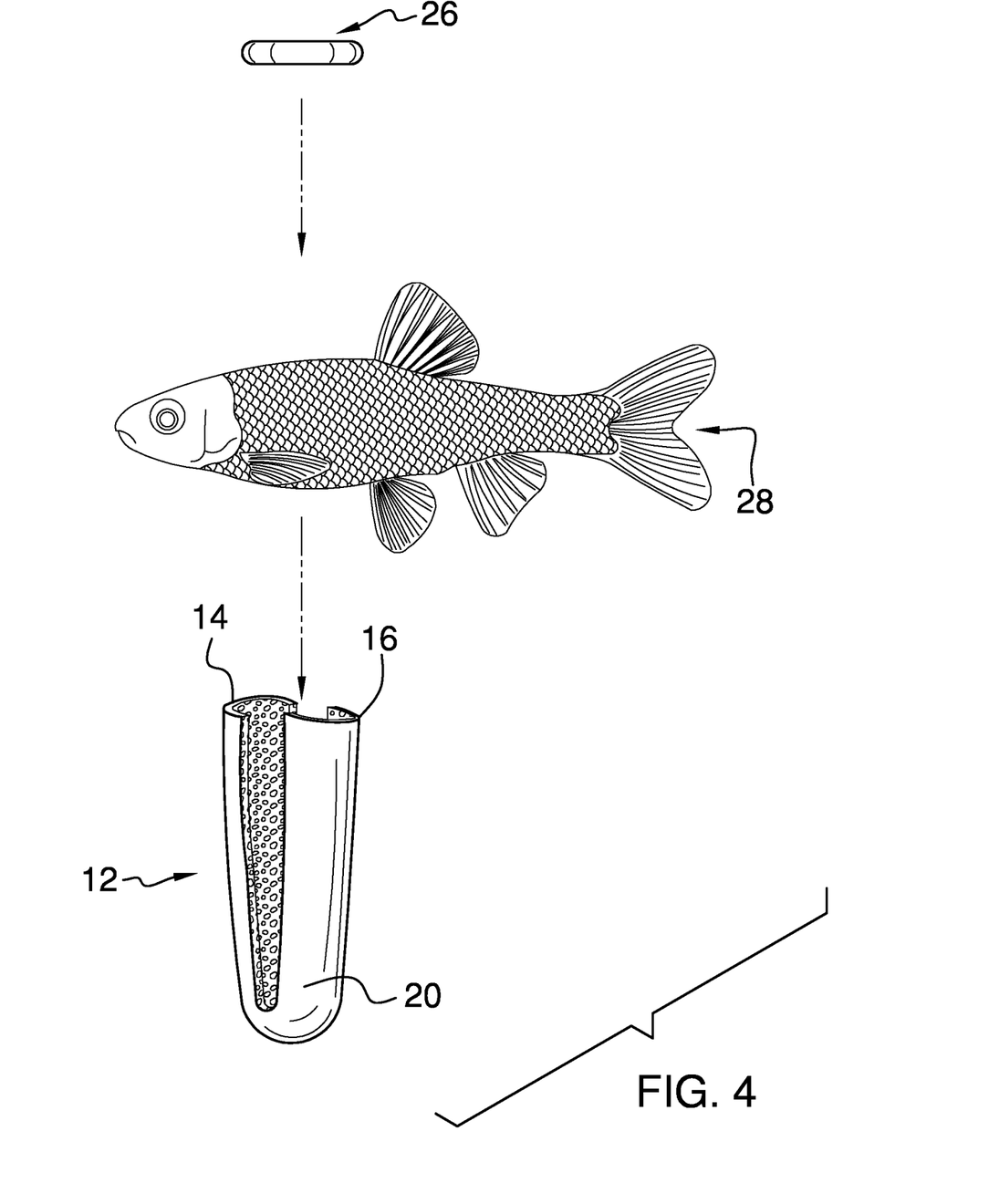
FIG. 4 is a perspective exploded in-use view of an embodiment of the disclosure.
Figure 5:
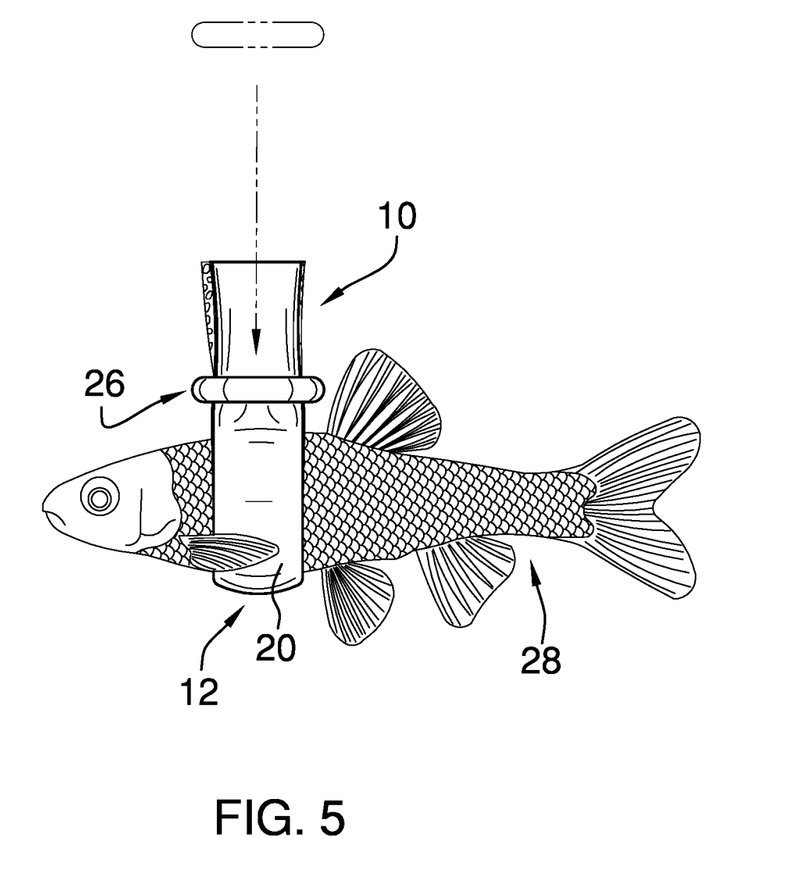
FIG. 5 is a front in-use view of an embodiment of the disclosure showing how an O-ring receives two ends of a flexible strip.
Figure 6:
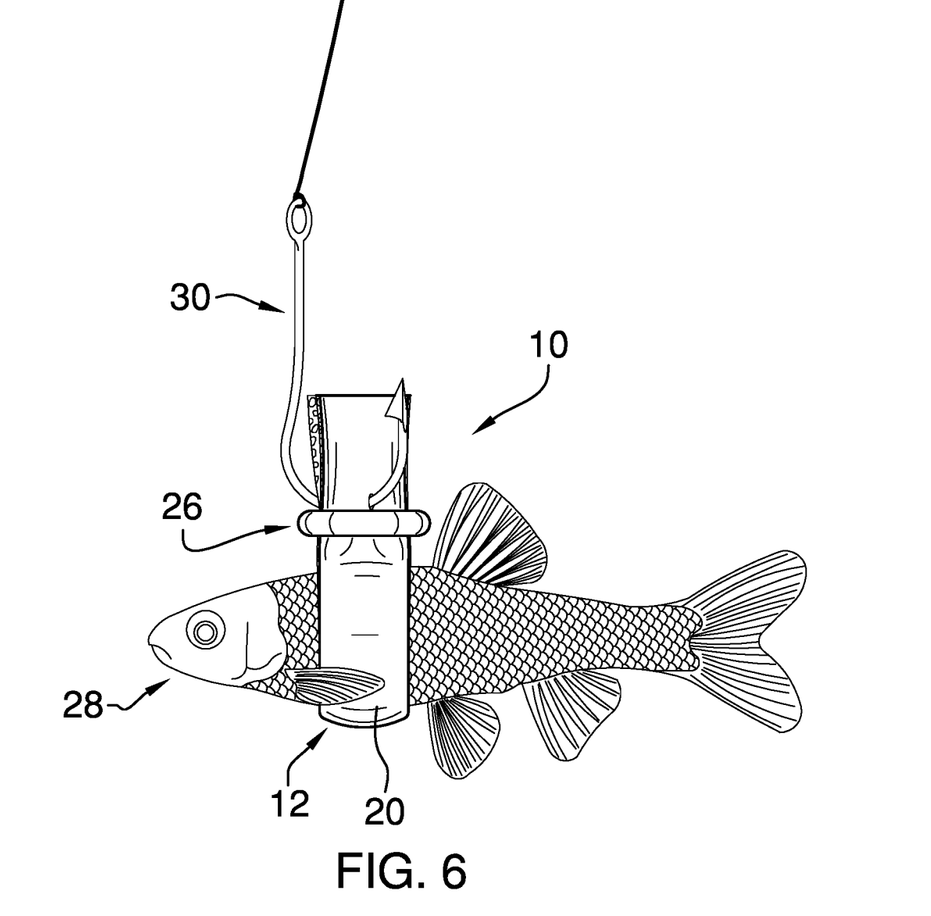
FIG. 6 is a front in-use view of an embodiment of the disclosure showing how a fishhook inserts through two ends of a flexible strip adjacent an O-ring.

An O-ring 26 elastically stretches to receive the first end 14 and the second end 16 simultaneously when the flexible strip 12 is in the wrapped position. The O-ring 26 exerts an elastic force on the second surface proximate the first end 14 and the second surface proximate the second end 16 such that the flexible strip 12 is retained in the wrapped position. The O-ring 26 is positionable on the flexible strip 12 while in the wrapped position adjacent to the loop 24 such that the O-ring 26 is configured to be held in place adjacent to the loop 24 by insertion of the fishhook 30 through the flexible strip 12 adjacent to the O-ring 26 opposite the loop 24. The O-ring 26 is constructed of rubber but may be constructed of any conventional elastic material.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A live bait holder comprising:
    a flexible strip being elongated from a first end to a second end, said flexible strip having a first surface and a second surface, said surfaces extending from said first end to said second end, said flexible strip having a pair of edges extending from said first end to said second end and extending from said first surface to said second surface,
        wherein said flexible strip is elastically bendable and elastically stretchable, said flexible strip being configured to be disposed in a wrapped position around a bait animal wherein a coextensive portion of said first surface and associated coextensive portions of each said edge are disposed in abutment with a surface of the bait animal to define a loop, said coextensive portion of said first surface and said associated coextensive portions of each said edge exerting an elastic force compressing the bait animal and frictionally engaging the surface of the bait animal;
    an O-ring, said O-ring elastically stretching to receive said first end and said second end simultaneously when said flexible strip is in said wrapped position, said O-ring exerting an elastic force on said second surface proximate said first end and said second surface proximate said second end such that said flexible strip is retained in said wrapped position, said O-ring being positionable on said flexible strip while in said wrapped position adjacent to said loop; and
    a fishhook, said flexible strip being perforable by said fishhook, said fishhook being extended through said flexible strip adjacent to said O-ring such that said O-ring is configured for being positioned between said fishhook and said loop whereby said fish hook is positioned opposite to said loop and said O-ring is secured in a static position on said flexible strip by said fishhook and said loop.

2. The live bait holder of claim 1 wherein said first surface is concave and said second surface is convex.

3. The live bait holder of claim 1 wherein said flexible strip is constructed of plastic.

4. The live bait holder of claim 1 wherein said O-ring is constructed of rubber.

5. The live bait holder of claim 1 wherein said surface and said edges are textured.

6. The live bait holder of claim 5 wherein said first surface and said edges are textured with a plurality of sharp projections extending from said first surface and each said edge respectively, wherein a first group of said plurality of sharp projections on said first surface angle toward a first of said edges and a second group of said plurality of sharp projections on said first surface angle toward a second of said edges, said sharp projections on said edges being angled toward said first surface, said plurality of sharp projections being configured to penetrate the surface of the bait animal while said flexible strip is in said wrapped position.

7. The live bait holder of claim 5 wherein said first surface and said edges are textured with a plurality of ribs protruding from said first surface and each said edge respectively, said ribs being elongated from said first end to said second end.

8. The live bait holder of claim 5 wherein said first surface and said edges are textured with a plurality of abrasive particulates protruding from said first surface and each said edge respectively.

9. The live bait holder of claim 8 wherein said plurality of abrasive particulates are constructed of glass.

10. A live bait holder comprising:

a flexible strip being elongated from a first end to a second end, said flexible strip having a concave surface and a convex surface, said surfaces extending from said first end to said second end, said flexible strip having a pair of edges extending from said first end to said second end and extending from said concave surface to said convex surface, said flexible strip being constructed of plastic, said concave surface and said pair of edges being textured, wherein said flexible strip is elastically bendable and elastically stretchable, said flexible strip being configured to be disposed in a wrapped position around a bait animal wherein a coextensive portion of said concave surface and associated coextensive portions of each said edge are disposed in abutment with a surface of the bait animal to define a loop, said coextensive portion of said concave surface and said associated coextensive portions of each said edge exerting an elastic force compressing the bait animal and frictionally engaging the surface of the bait animal;

an O-ring, said O-ring elastically stretching to receive said first end and said second end simultaneously when said flexible strip is in said wrapped position, said O-ring exerting an elastic force on said second surface proximate said first end and said second surface proximate said second end such that said flexible strip is retained in said wrapped position, said O-ring being positionable on said flexible strip while in said wrapped position adjacent to said loop; and a fishhook, said flexible strip being perforable by said fishhook, said fishhook being extended through said flexible strip adjacent to said O-ring such that said O-ring is configured for being positioned between said fishhook and said loop whereby said fish hook is positioned opposite to said loop and said O-ring is secured in a static position said flexible strip by said fishhook and said loop.

* * * * *